United States Patent [19]
Jung et al.

[11] Patent Number: 5,199,748
[45] Date of Patent: Apr. 6, 1993

[54] ROTARY COUPLING FOR TWO DIFFERENT FLUIDS

[75] Inventors: Liebhard Jung, Nesselwang; Helmut Heel, Lengenwang, both of Fed. Rep. of Germany

[73] Assignee: Ott Maschinentechnik GmbH, Kempten, Fed. Rep. of Germany

[21] Appl. No.: 820,547

[22] Filed: Jan. 14, 1992

[30] Foreign Application Priority Data

Feb. 5, 1991 [DE] Fed. Rep. of Germany ....... 4103376

[51] Int. Cl.$^5$ .............................................. F16L 39/04
[52] U.S. Cl. ..................................... 285/136; 285/134
[58] Field of Search ................. 285/134, 136, 190, 272

[56] References Cited

U.S. PATENT DOCUMENTS

| | | | |
|---|---|---|---|
| 2,877,026 | 3/1959 | Payne et al. | 285/136 X |
| 3,648,311 | 3/1972 | Voss | 285/134 X |
| 4,422,676 | 12/1983 | Sitabkhan | 285/136 |
| 4,858,961 | 8/1989 | Nunogaki | 285/136 X |
| 5,022,686 | 6/1991 | Heel et al. | 285/136 X |

FOREIGN PATENT DOCUMENTS 3120115 12/1982 Fed. Rep. of Germany .
3542014 1/1987 Fed. Rep. of Germany .

*Primary Examiner*—Eric K. Nicholson
*Attorney, Agent, or Firm*—Flynn, Thiel, Boutell & Tanis

[57] ABSTRACT

A rotary coupling for two different fluids. The coupling includes a fixed housing and hollow shaft mounted rotatably but axially immovably in the housing. The shaft is provided with a central through-flow channel for a first fluid and at least one second through-flow channel parallel thereto for a second fluid. In the housing there are provided two separate supply channels for the two fluids and two sliding ring sealing devices between these channels and the hollow shaft, arranged coaxially with an axis of rotation of the hollow shaft, through which sealing devices the fluids can be fed separately to the through-flow channels. The first sliding ring sealing device is arranged centrally between an inner end of the hollow shaft and a housing part with the first supply channel, while the second sliding ring sealing device surrounds the hollow shaft concentrically and includes a sliding ring rotatable with the hollow shaft and has at least one radial through passage, as well as two sliding rings bearing constantly under spring pressure on its two axially facing end faces. The second sliding ring sealing device is axially movable relative to the housing and the hollow shaft. The rotatable sliding ring is fixed to an inner bush coaxially surrounding the hollow shaft, which inner bush is adapted to be coupled and uncoupled from the hollow shaft in response to an axial sliding movement of the inner bush.

5 Claims, 1 Drawing Sheet

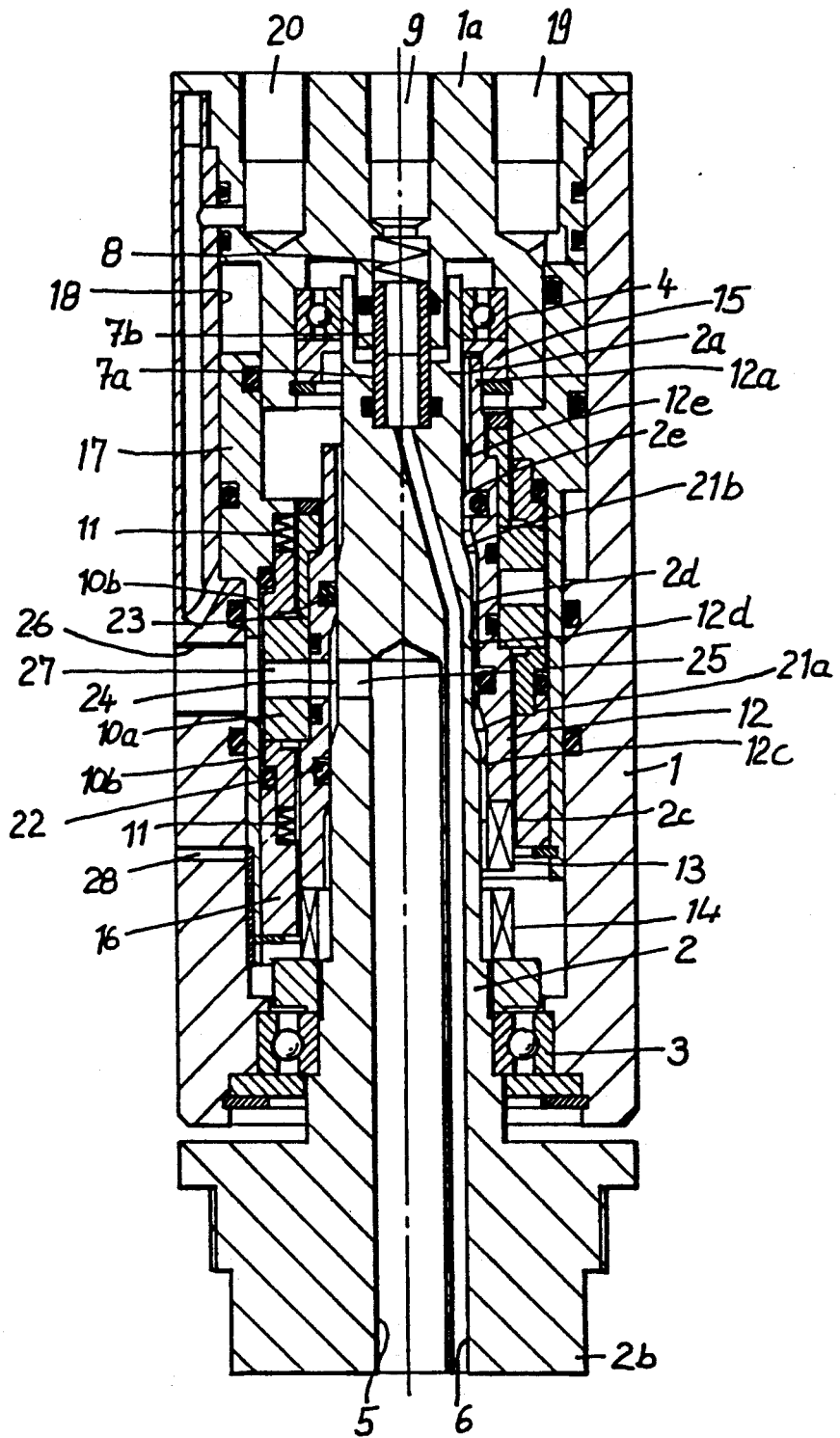

ROTARY COUPLING FOR TWO DIFFERENT FLUIDS

FIELD OF THE INVENTION

A rotary fluid coupling for conveying two different fluids, especially for use in machine tools.

BACKGROUND OF THE INVENTION

With machine tool spindles a clamping device (tool clamp) is often provided within the hollow machine tool spindle. This clamping device has a pull-rod extending coaxially relative to the spindle axis, with its front end provided with a gripping collet for engaging the tool in the region of the tool holder. The inner end of the pull-rod passes through a hydraulically acting, so-called release unit, which serves to actuate the clamping device. When the machine tool spindle is stationary, hydraulic oil under high pressure can be fed to the release unit through the first supply channel, the first sliding ring sealing device and the parallel second through-flow channel, whereby the release unit shifts the pull-rod in the machine tool spindle and the gripping collet releases the tool. In order that a cooling lubricant can be fed to the rotating tool, the pull-rod is made hollow and its end projecting out of the release unit is in communication with the central through-flow channel in the hollow shaft. The rotary coupling allows the feed of the cooling lubricant from the stationary housing to the rotating pull-rod through the second supply channel. When changing a tool, i.e. with the machine tool spindle stationary, air can be fed through the rotary coupling and the pull-rod to blow out the tool holder.

Rotary couplings for two different fluids are known in the most varied designs and for the most varied purposes. One rotary coupling of the kind initially described (in-house state of the art) is indeed suitable for wet machining, in which cooling lubricant is constantly fed to the rotating tool, but significant problems arise in dry machining. Since the sliding rings of the second sliding ring sealing device would be rapidly destroyed at high spindle speeds with no lubrication and no cooling with dry running, the second sliding ring sealing device must be supplied with cooling lubricant during dry running also. In order that this cooling lubricant shall not reach the tool during the dry machining, a spring-loaded check valve is fitted in the pull-rod or in the hollow shaft, which valve shuts off the through-flow channel in the hollow shaft or the hollow pull-rod during dry machining, in which the cooling lubricant is fed under low pressure to the rotary coupling. However this non-return valve leads to further problems, since it hinders inter alia the through-flow of the cooling lubricant during wet machining. Furthermore the sliding rings of the second sliding ring sealing device are only cooled inadequately with the use of a non-return valve, since no forced circulation of the cooling lubricant is provided for. For this reason the known rotary coupling is not suitable for higher spindle speeds and increased wear of the sliding rings occurs during dry machining on account of the inadequate cooling. If wet and dry machining alternate, the blowing out of the cooling lubricant from the through-flow channel and the pull-rod on each tool change is extremely troublesome. The workpieces or measuring tools to be kept dry are actually wetted with cooling lubricant. Moreover the operator is affected by fluid mist. In this it is to be noted that, even with continuous dry machining, cooling lubricant must be fed in afresh after each tool change and each blow-out of the second sliding ring sealing device.

Also known are rotary couplings (DE-C1 3 542 014) in which one sliding ring of the sliding ring sealing device can be lifted off the other sliding ring for dry machining. With sliding ring sealing devices the sealing surfaces are very flat and they are very hard. The presence of small solid particles in the cooling lubricant cannot be avoided. With the sliding rings raised solid particles get between the sealing faces and, when the sliding rings are pressed together again, the solid particles lead to rapid destruction of the sliding ring seal. Moreover, with prolonged dry running, a layer can form on the sliding rings which later, when the sliding rings are pressed together again, leads to increased leakage.

SUMMARY OF THE INVENTION

The invention is therefore based on the problem of providing a rotary coupling of the kind initially referred to for two different fluids, especially for machine tool spindles, which facilitates dry machining even at high speeds, without wear of the sliding rings of the second sliding ring sealing device, while avoiding the above disadvantages, and in which the flow through the central through-flow channel can take place without interruption.

This is achieved according to the invention in that the second sliding ring sealing device is axially movable relative to the housing and the hollow shaft, the rotatable sliding ring being arranged fast against rotation on an inner bush surrounding the hollow shaft coaxially, adapted to be coupled thereto and axially slidable thereon, the two stationary sliding rings being arranged in an outer bush surrounding the inner bush concentrically and axially slidable, the outer bush having an annular piston sliding in a cylinder chamber of the housing, and the hollow shaft having in the sliding region of the inner bush three sections reducing in diameter stepwise towards the hollow shaft end and the inner wall of the inner bush having three sections correspondingly reducing stepwise in diameter, and the inner bush having O-rings at the beginning of the second and third sections, which only bear in the coupled state of the inner bush on the sections of the hollow shaft corresponding in diameter and sealing between them an annular chamber which communicates with the radial bore of the hollow shaft.

The invention is thus based on the concept of arranging the second sliding ring sealing device in bushes slidable together, in order that the second sliding ring sealing device shall be uncoupled by axial displacement from the hollow shaft during dry running, i.e. when no fluid is to be fed through the second sliding ring sealing device. While the machine tool spindle rotates together with the hollow shaft during dry machining, the uncoupled second sliding ring sealing device is stationary. In consequence no friction arises at the sliding rings of the second sliding ring sealing device, nor any wear or overheating, so that the second sliding ring sealing device does not need to be cooled during dry running. Accordingly the non-return valve in the hollow shaft or the pull-rod can also be dispensed with and unimpeded through-flow of cooling lubricant is ensured during wet machining. As a result of the special formation of the hollow shaft with three sections reducing stepwise, the O-rings are not in contact with the hollow shaft during dry running, so that no wear or overheating con occur even at the O-rings. If cooling lubricant is to be fed to the tool during wet machining, the outer bush is displaced hydraulically or pneumatically relative to the hollow shaft by means of its annular piston. It carries the inner bush with it, whereby this is in the first placed coupled rotationally fast to the hollow shaft and in the second place is sealed relative to the hollow shaft by the O-rings. During wet machining the inner bush coupled to the hollow shaft rotates together with the hollow shaft, so that no relative movement takes place between the O-rings and the hollow shaft and so wear of the O-rings is also avoided during wet machining. Since the second sliding ring sealing device is completely uncoupled from the hollow shaft during dry running, the new rotary coupling is also suitable for high speeds of rotation. The first rotary coupling presents no problems, since cooling and lubrication are here ensured by constant feed of a fluid and since the sealing rings have a relatively small diameter on account of their central arrangement, so that the sliding speeds are relatively small.

BRIEF DESCRIPTION OF THE DRAWING

The invention is explained in more detail below, with reference to an embodiment shown in the drawing.

The drawing shows an axial section of the rotary coupling, to the left in the coupled state of the second sliding ring sealing device with feed-through of two different fluids, to the right in the uncoupled state.

DETAILED DESCRIPTION

The hollow shaft 2 is mounted rotatably but axially immovable in a fixed housing 1, 1a by means of the bearings 3, 4. The hollow shaft 2 has a central through-flow channel 5, in which can engage the one end of a pull-rod, not shown, of a clamping device arranged in a machine tool spindle. The hollow shaft 2 has a second through-flow channel 6 running parallel to the central through-flow channel 5. The outer end 2b of the hollow shaft 2 can be connected to the so-called release deviceof the clamping device, whereby hydraulic oil under high pressure is fed to this release device through the through-flow channel 6 when the machine tool spindle is stationary.

On the inner end 2a of the hollow shaft 2 there is provided the sliding ring 7a of a first sliding ring sealing device 7a, 7b, onto which the sliding ring 7b movably mounted in the housing cover 1a is constantly pressed by a spring 8. The housing cover 1a has a first supply channel 9 for a first fluid, namely hydraulic oil.

In order to feed a second fluid, e.g. cooling lubricant or air to the hollow shaft 2, a second sliding ring sealing device is provided, consisting of the sliding rings 10a, 10b and the springs 11. The sliding ring 10a is arranged rotationally fast on an inner bush 12 surrounding the hollow shaft 2 concentrically. The inner bush has a plurality of coupling teeth 13 on its end facing away from the hollow shaft end 2a, which teeth can be coupled by axial displacement of the inner bush 12 with corresponding coupling teeth 14 connected fast against rotation to the hollow shaft 2. The inner bush 12 is shown to the left of the drawing in the coupled state, to the right in the uncoupled state.

Preferably the end 12a of the inner bush facing the housing cover 1a is so formed that it engages in its uncoupled state in a retainer ring 15 provided in the housing cover 1a. The end 12a is thus protected from radial displacement with the bush 12 uncoupled.

The two sliding rings 10b of the sliding ring sealing device, which are stationary in all operating states, are arranged in an outer bush 16 concentrically surrounding the inner bush 12 and are urged constantly by the springs 11 on to the sliding ring 10a. The outer bush 16 is likewise axially movable and comprises an annular piston 17, which can move in the cylinder chamber 18 of the housing 1. The cylinder chamber 18 can act to pressurize the two sides of the annular piston 17 alternately by way of supply bores 19, 20 in the housing cover 1a.

The hollow shaft 2 comprises in the sliding region of the inner bush 12 three sections 2c, 2d and 2e tapering stepwise in diameter towards the hollow shaft end 2a. Conical transitions 21a, 21b are provided in each case between these three sections 2c, 2d and 2e. The inner wall of the inner bush comprises three sections 12c, 12d and 12e likewise tapering stepwise in diameter, corresponding in their diameters to the sections 2c, 2d and 2e. The inner bush 12 further comprises an O-ring 22, 23 at the start of each of the second section 12d and the third section 12e. However, each of these O-rings 22, 23 only bears in the coupled state of the inner bush on the sections 2c and 2d of the hollow shaft 2 respectively corresponding in diameter, as is apparent to the left in the drawing, while clearance is provided between the O-rings 22, 23 and the sections 2d and 2e respectively in the uncoupled state, as is shown to the right in the drawing. In the coupled state of the inner bush 12 the two O-rings 22, 23 seal an annular chamber 24, which communicates with a radial bore 25 in the hollow shaft 2. The housing 1 is provided with a second supply channel 26, serving for the supply of cooling lubricant or air. This supply channel 26 lies in the region of the coupled sliding ring 10a, which is provided for its part with a radial bore 27. Any leakage can run out of the housing via the leakage bore 28.

If no cooling lubricant is to be fed to the machine tool spindle, the bushes 12, 16 are located, with their associated sliding rings 10a, 10b in the uncoupled position shown to the right in the drawing. There is no kind of contact between the hollow shaft 2 on the one hand and the inner bush 12, as well as its O-rings, on the other hand. While the hollow shaft 2 rotates, the bush 12 and the sliding ring 10a carried thereby are stationary. There is accordingly no relative motion between the sliding rings 10a and 10b either and thus no wear and no overheating of the sliding rings can take place.

When however cooling lubricant is to be fed to a tool fitted on the machine tool spindle, the cylinder space above the annular piston 17 is firstly pressurized via the supply bore 19. The pressure medium can be air but if desired it can be cooling lubricant, so long as a spring-loaded valve is provided in a supply line, not shown, to the supply channel 26, which does not initially open in response to slight pressure of the cooling lubricant. Through preservization of the cylinder space above the annular piston 17 the annular piston 17 and the outer bush 16 connected thereto are pushed down. The inner bush 12 is also entrained via the sliding rings 10b and 10a and the coupling teeth 13 of the inner bush come into engagement with the coupling teeth 14 of the hollow shaft 2. At the same time the O-rings 22, 23 bear in sealing manner on the corresponding sections 2c and 2d of the hollow shaft. When the hollow shaft 2 now rotates it carries the inner bush 12 with it through the coupling teeth 13, 14 and the sliding ring 10a connected fast to the inner bush 12 then rotates together with the hollow shaft. The outer bush 16 is however prevented from rotating and the sliding rings 10b carried thereby are retained fast against rotation in the outer bush 16. Cooling lubricant, or when changing the tool, compressed air for blowing out, can now be fed to the through-flow channel 5 via the supply channel 26, the radial bore 27 in the sliding ring 10a and the radial bore 25.

When dry machining without cooling lubricant is to take place, the part of the cylinder chamber 18 below the annular piston 17 is firstly pressurized by feeding a pressure medium via the supply bore 20, whereby the outer bush 16 and also the inner bush 12 are brought into the uncoupled position shown to the right in the drawing.

If desired it would also be possible to act on the annular piston 17 with pressure medium on one side only and to effect the return of the annular piston 17 to the uncoupled state by spring force.

Furthermore the O-rings 22, 23 can be arranged by kinematic inversion not in the bush 12 but on the hollow shaft 2, on its sections 2c and 2d.

The embodiments of the invention in which an exclusive property or privilege is claimed are defined as follows:

1. In a rotary coupling for first and second different fluids comprising a fixed housing and a hollow shaft mounted rotatably but axially immovably therein, the shaft being provided with a central through-flow channel for the first fluid and at least one second through-flow channel parallel thereto for the second fluid, first and second separate supply channels provided in the housing for the first and second fluids. respectively, and first and second sliding ring sealing devices between the first and second supply channels, respectively, and the hollow shaft, arranged coaxially with an axis of rotation for the hollow shaft, through which first and second sealing devices the first and second fluids can be fed separately to the respective first and second through-flow channels, wherein the first sliding ring sealing device is arranged centrally between an inner end of the hollow shaft and a housing part with the first supply channel, while the second sliding ring sealing device surrounds the hollow shaft concentrically and comprises a sliding ring rotatable with the hollow shaft and provided with at least one radial through passage, as well as two sliding rings having spring means for causing the two sliding rings to bear constantly against to axially facing end faces of the sliding ring, said two sliding rings being stationary relative to the housing, and wherein the hollow shaft has at least one radial bore which connects one of the first and second through-flow channels with the rotary sliding ring, the improvement wherein the second sliding ring sealing device is axially movable relative to the housing and the hollow shaft, the rotatable sliding ring being fixed against relative rotation to an inner bush coaxially surrounding the hollow shaft, with coupling means being provided for effecting a coupling and an uncoupling of the inner bush and the rotatable shaft and a relative axial sliding movement of the inner bush with respect to the hollow shaft, the two sliding rings being arranged in an outer bush concentrically and axially slidably surrounding the inner bush, the outer bush having an annular piston sliding in a cylinder chamber in the housing, and wherein the hollow shaft has in the sliding region of the inner bush first, second and third sections reducing, respectively, in diameter stepwise towards the inner end, a radially inner wall of the inner bush having three sections correspondingly reducing stepwise in diameter, and wherein the inner bush has O-rings at one axial end of each of the second and third sections, which only bear in the coupled state of the inner bush on the second and third sections of the hollow shaft corresponding in diameter and seal between them an annular chamber which communicates with the radial bore through the hollow shaft, so that during dry machining, when no second fluid is to be supplied through the second sliding ring sealing device to the hollow shaft, the outer bush can be moved into a rest position uncoupled from the hollow shaft caused by an axial movement of the annular piston together with the second sliding ring sealing device and the inner bush, in which rest position the inner bush is uncoupled from the hollow shaft and the inner bush and the O-rings are free of contact with a radially outer surface of the hollow shaft.

2. The rotary coupling according to claim 1, wherein conical transitions are provided in each case between the three sections on the hollow shaft and on the inner bush.

3. The rotary coupling according to claim 1, wherein the inner bush has coupling teeth at an end remote from the inner end of the hollow shaft, which coupling teeth can be engaged by axial displacement of the inner bush with corresponding coupling teeth on the hollow shaft to enable the inner bush to rotate with the hollow shaft.

4. The rotary coupling according to claim 1, wherein an end of the housing adjacent the inner end of the hollow shaft has a retainer member, wherein an end of the inner bush adjacent the inner end of the hollow shaft is received, in the uncoupled state of the inner bush from the hollow shaft, in the retainer.

5. The rotary coupling according to claim 1, wherein the cylinder chamber in the housing can be pressurized on opposite sides of the annular piston.

* * * * *